(No Model.)

A. J. CREAMER.
PENMANSHIP COPY BOOK.

No. 498,628. Patented May 30, 1893.

Attest—
C. W. Miles
T. Simmons

Inventor—
Albert J. Creamer
By Wood & Boyd Attys.

UNITED STATES PATENT OFFICE.

ALBERT J. CREAMER, OF WASHINGTON COURT-HOUSE, OHIO, ASSIGNOR TO THE CREAMER SCIENTIFIC PENMANSHIP COMPANY, OF SAME PLACE.

PENMANSHIP COPY-BOOK.

SPECIFICATION forming part of Letters Patent No. 498,628, dated May 30, 1893.

Application filed May 6, 1892. Serial No. 432,066. (No model.)

*To all whom it may concern:*

Be it known that I, ALBERT J. CREAMER, a citizen of the United States, residing at Washington Court-House, in the county of Fayette and State of Ohio, have invented certain new and useful Improvements in Penmanship Copy-Books, of which the following is a specification.

The object of this invention is to provide copy leaves or copy-books with given lines so arranged as to form regular spaces to indicate or determine the size, slant and special features of letters and parts of letters, and also words and sentences in body-writing.

The various features of the invention are fully set forth in the description of the accompanying drawings making a part of this specification, in which—

Figure 1:
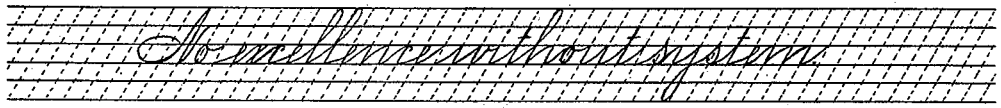
Figure 2:
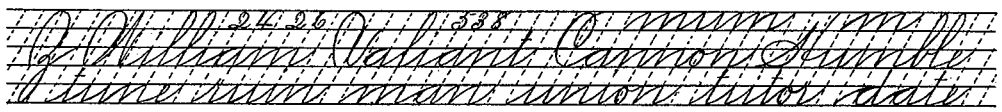
Figure 3:
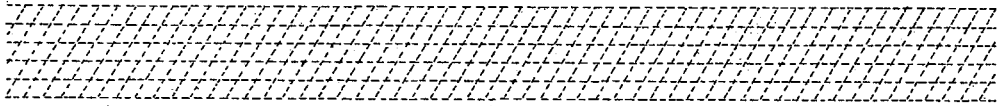

Figure 1 is a diagram illustrating a scale with a copy. Fig. 2 is a diagram of the scale showing it as used in practice. Fig. 3 is a modification of Fig. 1.

The written sentence "No excellence without system," Fig. 1, shows the position of various letters placed in the spaces which form what is termed a scale of measurement.

In the preferred form shown in Fig. 1 the scale is composed of six horizontal, parallel lines divided into numerous spaces of equal height and width, and crossed or checked by slanted dotted lines corresponding with what is known as the main slant in penmanship; these lines establish a mathematical standard of measurement for all letters, parts of letters, figures and movement exercises. Thus, the scale shows the number of spaces or parts of spaces a letter, figure or movement occupies and at the same time indicates the size and slant of letters and parts of letters.

It will be observed that in the scales containing copies the third line from the bottom is used as the regular base line from which the height and depth of all letters are determined; but it will be also observed that the first and fifth lines may be used as extra base lines for the practice of one and two space letters or figures as set forth in Fig. 2.

The unit of measurement in penmanship is one space as shown in the scale. From this unit of measurement is determined the width of all letters in word-writing, the width of the written word and the spacing of words in sentence writing. Height is the number of spaces or parts of spaces a letter extends above the base line. Depth the number of spaces or parts of spaces a letter extends below the base line. Width the number of spaces a letter extends from left to right along the base line. And this scale is a general standard for all letters, words and figures. This scale, therefore, is of itself a correct guide to proper letter formation and variation from this uniform scale is self evident to the pupil, and is a constant monitor, and a material aid to the acquisition of uniformity of shape, style and finish in the art of penmanship.

In the modification shown in Fig. 3 all lines are shown dotted, but these lines may be full lines if made fine and sharp; but I prefer the dotted slant lines as it requires the pupil to make the down strokes of all letters and they are less liable to be obscured than where full lines are used.

It will be observed that this scale can be used with any system of penmanship, the spaces being positive guides by which to form the letters. So, also, with this form of dotted lines the small letters may be made on the lines or in the spaces between the lines as desired, the lines not making a part of the letters. This scale system may be used upon loose sheets but I prefer to have them bound together in the form of a copy-book, or practice tablet.

Having described my invention, what I claim is—

1. A penmanship scale formed of six horizontal, parallel lines, and oblique, parallel cross lines, which form five equal vertical sets of oblique spaces designating the height, depth, width, slant, and spacing of letters, parts of letters, words and sentences, said scale being impressed upon a sheet or tablet leaf, substantially as specified.

2. A copy-book formed of a series of bound sheets having impressed upon the pages thereof a penmanship scale formed of six horizontal lines, and dotted, slanting cross lines which form five vertical sets of equal oblique spaces designating the height, depth, width, slant and spacing of letters, parts of letters, words, and sentences, substantially as specified.

3. A penmanship scale formed of six parallel horizontal lines and a series of parallel slanting dotted lines crossing the horizontal lines, which form five sets of equal spaces from top to bottom, designating the height, depth, width, slant and spacing of words, letters and parts of letters, said scale being impressed upon a sheet or tablet piece, substantially as specified.

In testimony whereof I have hereunto set my hand.

ALBERT J. CREAMER.

Witnesses:
T. SIMMONS.
C. W. MILES.